UNITED STATES PATENT OFFICE.

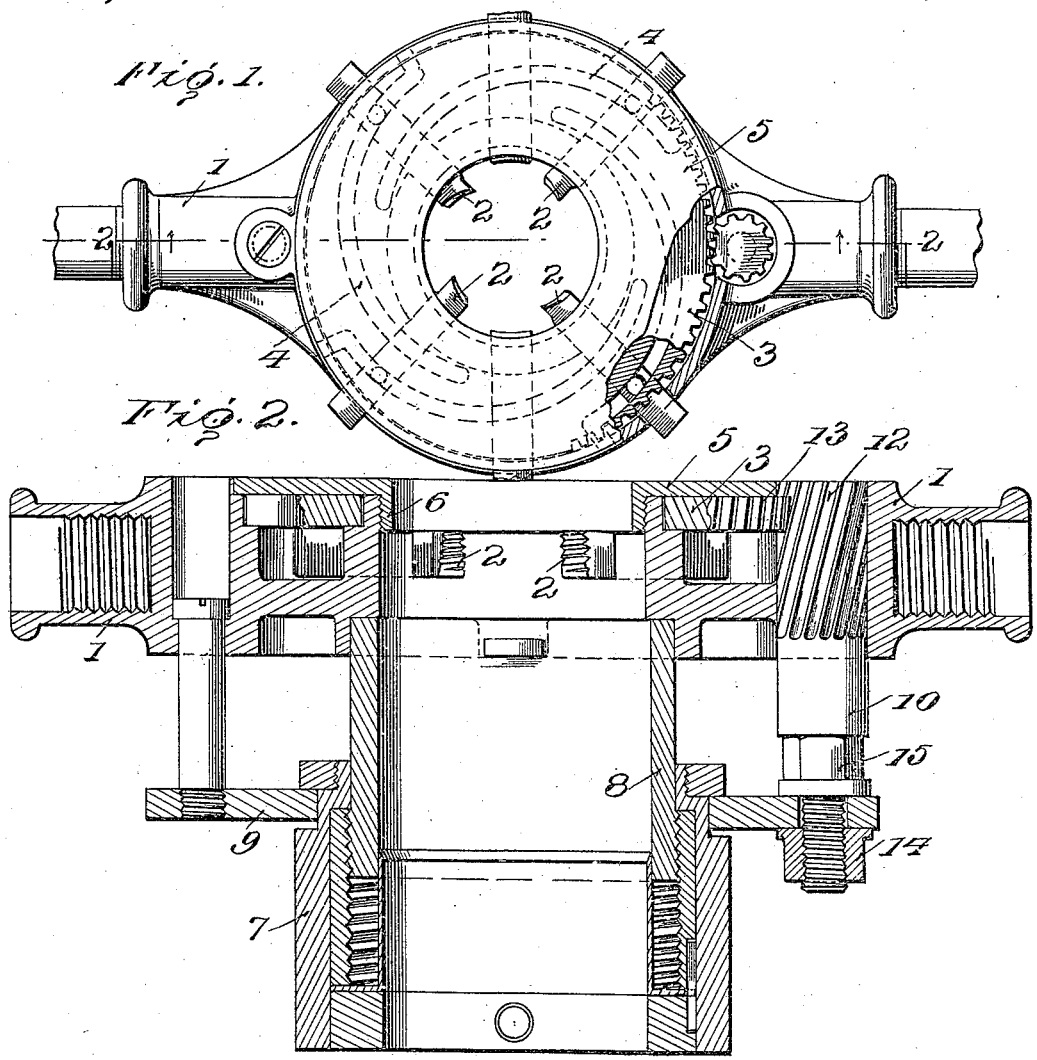

JOHN B. PHILLIPS, OF WARREN, OHIO, ASSIGNOR TO THE BORDEN COMPANY, OF WARREN, OHIO, A CORPORATION OF OHIO.

THREAD-CUTTING TOOL.

948,706.  Specification of Letters Patent.  Patented Feb. 8, 1910.

Application filed January 22, 1909. Serial No. 473,707.

*To all whom it may concern:*

Be it known that I, JOHN B. PHILLIPS, of Warren, in the county of Trumbull and State of Ohio, have invented certain new and useful Improvements in Thread-Cutting Tools; and I do hereby declare the following to be a full, clear, and exact description of the invention, such as will enable others skilled in the art to which it appertains to make and use the same.

The primary object of this invention is to provide in an adjustable die stock, for cutting taper threads, simple and highly-efficient means for effecting the gradual recession of the chasers. And further objects are to provide improved means for adjusting the chasers to accommodate pipes of different sizes; to avoid the use of projections on the chaser-adjusting plate, and to guard against all danger of such plate slipping during the cutting operation.

The invention will be hereinafter fully set forth and particularly pointed out in the claims.

In the accompanying drawings, Figure 1 is a front elevation. Fig. 2 is a vertical longitudinal sectional view.

Referring to the drawings, 1 designates the housing; 2 a series of radially-arranged chasers; and 3 a single plate constructed to engage the chasers so that when moved relatively to the housing it will adjust all the chasers simultaneously. Each chaser is shown as having a lug to take in one of a series of eccentrically-arranged slots 4 in the plate. I have shown a second plate 5 for retaining plate 3 in position, said plate 5 having a threaded flange 6 working in the threaded wall of the central tubular opening of the housing. It is obvious, however, that any suitable means may be employed for retaining the chaser-engaging plate in position.

7 designates the work-holder which is ordinarily provided with a female screw-thread to receive the lead-screw of the sleeve 8 of the housing. This work-holder forms the support for a rotatable ring 9 which is held as against moving longitudinally of its axis, and is provided with an opening to accommodate the reduced end of a post 10 which extends into an opening in the housing. This post is shown as formed with spirally-arranged teeth 12 which mesh with a segmental series of teeth 13 formed on the periphery of plate 3. This post is shown as being detachably secured to ring 9 by a nut 14 so that when the post is made fast to the ring the chaser-engaging plate will be gradually rotated, relatively to the housing, as the latter travels toward the work-holder. The chasers are caused or permitted to recede, and are positive in action.

To adapt the device to pipes of different sizes, the nut 14 is loosened and a wrench, or other suitable tool, is applied to a flattened portion 15 of the post so as to turn the latter axially. In this way the chaser-engaging plate will be revolved and the chasers set as desired. Thereafter the nut is re-tightened and the device ready for use.

In practice, the chasers being properly set, and the work-holder mounted on the pipe to be threaded, the cutting is effected by the clock-wise rotation of the housing. As the latter travels toward the work-holder, in cutting taper threads, the chaser-engaging plate will be moved or allowed to move relatively to the housing to cause or permit the gradual recession of the chasers. This is due to the intermeshing of teeth 13 with the spirally-arranged teeth of the post fixed to the rotatable ring.

I claim as my invention:—

1. In a threading tool for cutting tapered threads, in combination with a work-holder, a housing movable toward such work-holder, a series of radially-arranged chasers, a rotatable plate mounted on the housing for engaging all the chasers, said plate having teeth in its periphery, a post having spirally-arranged teeth with which the teeth of the chaser-engaging plate engage, and a rotatable ring mounted on the work-holder and held as against longitudinal movement, said post being secured to said ring.

2. In a threading tool for cutting tapered threads, in combination with a work-holder, a housing movable toward such work-holder, a series of radially-arranged chasers, a rotatable plate mounted on the housing for engaging all the chasers, said plate having teeth in its periphery, a post having spirally-arranged teeth with which the teeth of the chaser-adjusting plate engage, a rotatable ring mounted on the work-holder and held as against longitudinal movement, and means for detachably securing said post to said ring.

3. In a threading tool for cutting tapered threads, in combination with a work-holder, a housing movable toward such work-holder, a series of radially-arranged chasers, a rotatable plate mounted on the housing for engaging all the chasers, said plate having teeth in its periphery, a post having spirally-arranged teeth with which the teeth of the chaser-adjusting plate engage, a rotatable ring mounted on the work-holder and held as against longitudinal movement, and means for detachably securing said post to said ring, said post having a portion whereby it may be turned when released from said ring to adjust the position of the chasers and the chaser-adjusting plate.

In testimony whereof, I have signed this specification in the presence of two subscribing witnesses.

JOHN B. PHILLIPS.

Witnesses:
JNO. W. BECHTEL,
GRANDON MORAN.